United States Patent [19]

Sieber et al.

[11] Patent Number: 4,589,391
[45] Date of Patent: May 20, 1986

[54] CONTROLLING DEVICE FOR THE START OF INJECTION IN AN INTERNAL COMBUSTION ENGINE OPERATING WITH SELF-IGNITION

[75] Inventors: Albrecht Sieber, Böblingen; Joachim Wawretzko, Stuttgart; both of Fed. Rep. of Germany

[73] Assignee: Robert Bosch GmbH, Stuttgart, Fed. Rep. of Germany

[21] Appl. No.: 417,733

[22] Filed: Sep. 13, 1982

[30] Foreign Application Priority Data

Jan. 27, 1982 [DE] Fed. Rep. of Germany ....... 3202614

[51] Int. Cl.[4] ............................................. F02M 39/00
[52] U.S. Cl. ..................................... 123/357; 123/500; 123/198 D; 123/501
[58] Field of Search .............................. 123/357–359, 123/500, 501, 502, 179 L, 198 D, 198 DB; 73/119 A

[56] References Cited

U.S. PATENT DOCUMENTS

| 4,355,621 | 10/1982 | Yasuhara | 123/500 |
| 4,370,961 | 1/1983 | Brown | 123/357 |
| 4,378,775 | 4/1983 | Straubel | 123/501 |
| 4,395,905 | 8/1983 | Fujimori | 123/357 |

Primary Examiner—Carl Stuart Miller
Attorney, Agent, or Firm—Edwin E. Greigg

[57] ABSTRACT

A device is proposed for controlling the injection start to a set-point value dependent on operating parameters, in which the period of time between the appearance of an injection start signal and a reference marking (for instance, a top-dead-center signal) is counted out and the result of counting is compared with the set-point value. To avoid malfunctioning, the triggering of the counting process is possible in only one, predetermined crankshaft angle range. Various values are provided for the counting-out frequency. In the exemplary embodiment they are within the range between 50 and 200 kHz. In case of failure, a control of injection onset is effected, and as needed, a limitation of the fuel quantity as well—for instance to 70% of the respectively determined quantity.

6 Claims, 8 Drawing Figures

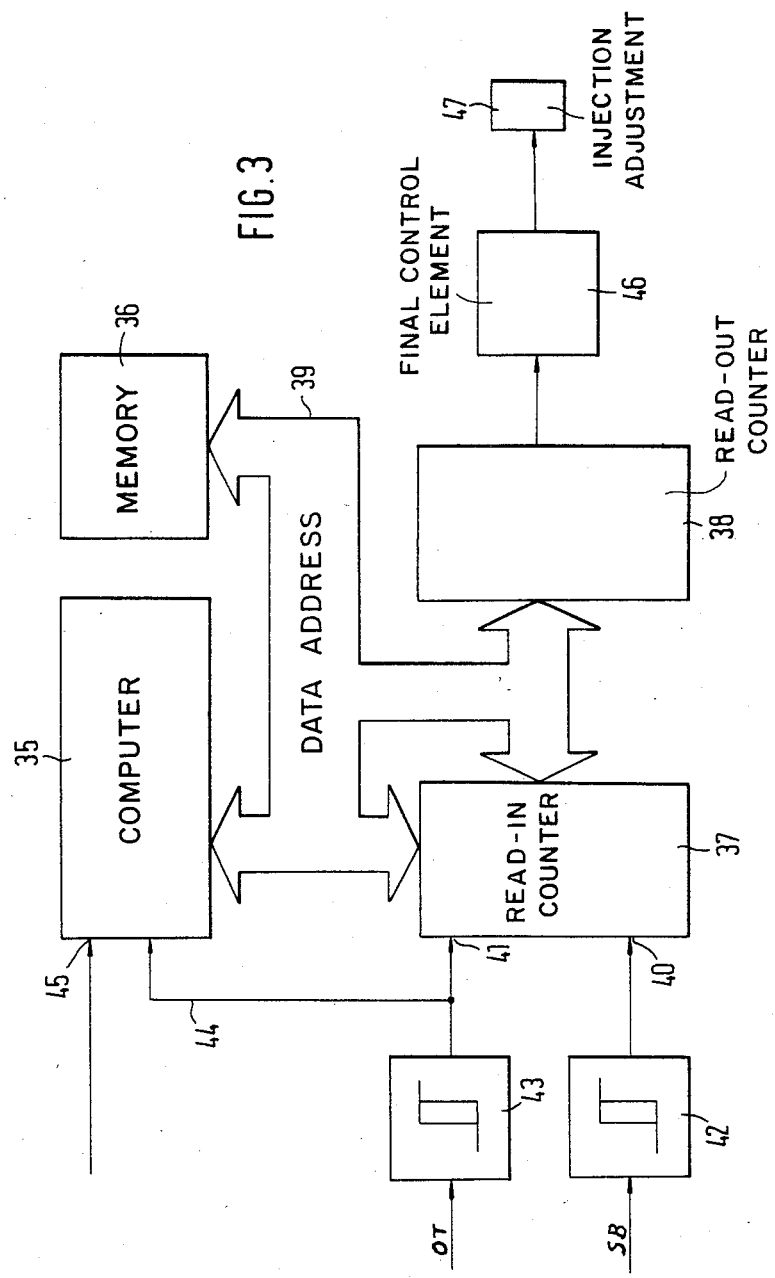

CONTROLLING DEVICE FOR THE START OF INJECTION IN AN INTERNAL COMBUSTION ENGINE OPERATING WITH SELF-IGNITION

BACKGROUND OF THE INVENTION

Controlling the start of injection in self-igniting internal combustion engines is just as important as controlling the initiation of ignition in Otto engines. These variables have a critical influence on engine output and behavior and on the exhaust gas composition. The principles and effects of controlling the injection start have long been known. With a view to rising energy costs and increasingly stringent regulations for the composition of the exhaust gas, however, it is important to make this control more precise and to optimize it.

From German Offenlegungsschrift No. 26 53 046 (U.S. Pat. No. 4,265,200), an injection start controlling device is known in which a set-point value dependent on operating characteristics is formed, this set-point value is compared with a measured actual value, and the difference between the two values is subjected to a control process. The essential feature of this known injection start controlling device is a reference marking on the crankshaft prior to the latest possible onset of injection. The crankshaft increments until the actual value of the injection start are counted with respect to this reference marking and processed by closed-loop control techniques.

The known device requires two sensors, one for the reference marking and one for the crankshaft angle increments. For mass production at favorable expense or cost, this dual sensor has proven too expensive, and it is, therefore, one of the objects of the invention to create an injection start controlling means having one sensor which is simple and reliable.

OBJECT AND SUMMARY OF THE INVENTION

The controlling device according to the invention for the injection start in an internal combustion engine operating with self ignition is distinguished by a simple sensor configuration, which is accordingly not only cost-efficient but is also relatively invulnerable to malfunctioning.

The invention will be better understood and further objects and advantages thereof will become more apparent from the ensuing detailed description of a preferred embodiment taken in conjunction with the drawings.

BRIEF DESCRIPTION OF THE DRAWINGS

FIG. 3 is a rough block circuit diagram of a computer-controlled means of realizing the invention by software means.

DESCRIPTION OF THE EXEMPLARY EMBODIMENT

Figure 1:
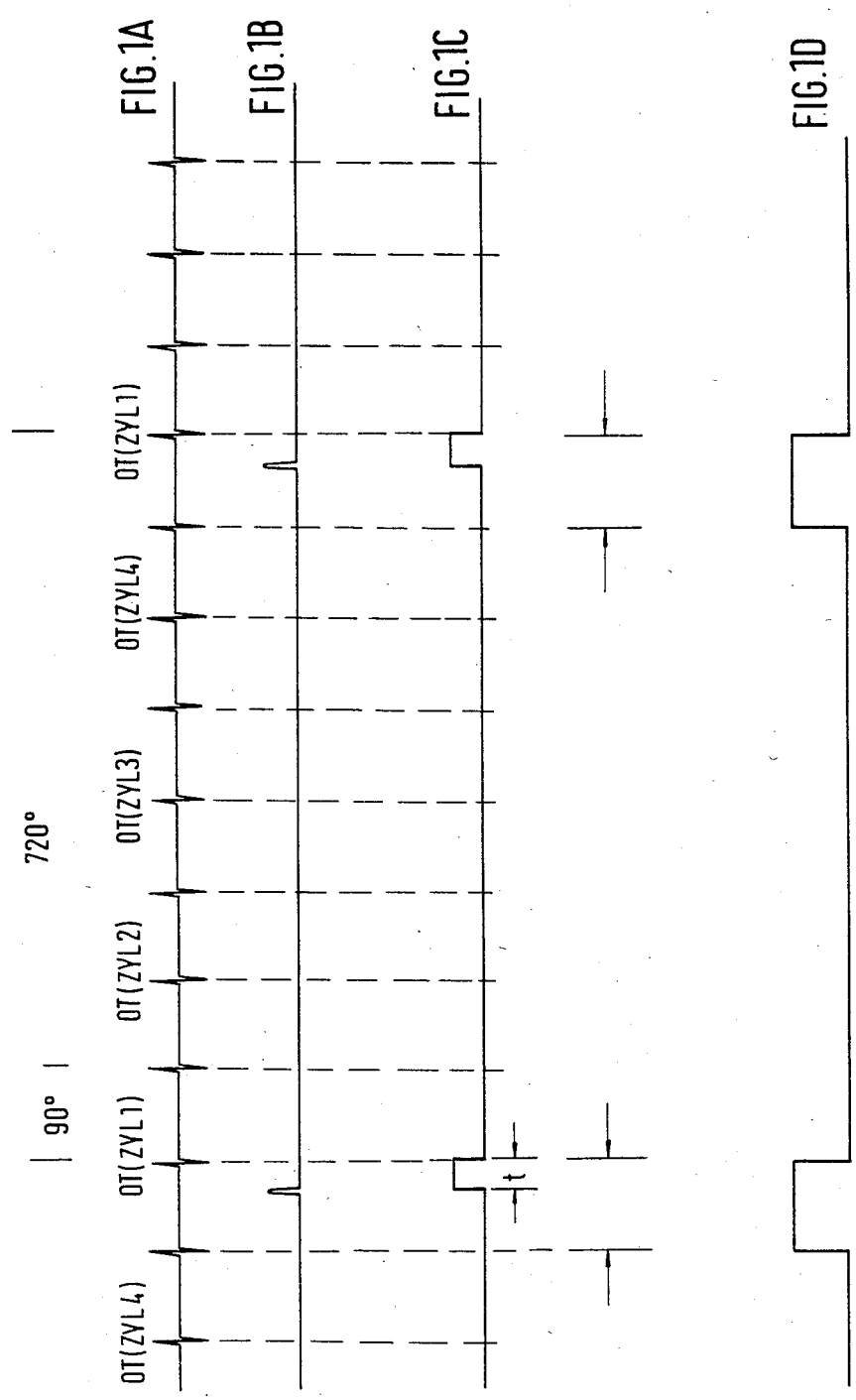
FIGS. 1A–1D show pulse diagrams for the controlling device according to the invention.

The exemplary embodiment relates to a controlling device for the start of injection in an internal combustion engine operating with self-ignition. In a four-cylinder engine, the signal relationships are as shown in FIG. 1. FIG. 1A shows a reference marking signal, which occurs every 90° of crankshaft angle and is synchronized with top dead center OT of the cylinders.

FIG. 1B shows the injection start signal with respect to an injection nozzle of the four-cylinder engine, the signal for injection start of the first cylinder being shown in particular. This signal inherently recurs every two revolutions of the crankshaft; the angular interval between signals is accordingly 720°.

FIG. 1C shows a signal derived from FIG. 1b, and it lasts from the start of injection up to top dead center of the associated cylinder. It is a time signal or angle signal having the fixed relationship expressed as follows:

$$\alpha[°KW] = t[\text{msec}] \cdot n[1/\text{min}] \cdot 6 \cdot 10^{-3}$$

where $\alpha$ is the encompassed crankshaft angle, t is the duration and n is the number of crankshaft revolutions per unit of time.

In accordance with the invention, the duration between the appearance of the injection start signal and the next subsequent reference marking is counted and then compared with the corresponding counter result pertaining to the set-point injection onset. In order to avoid errors in counting, caused by interference pulses, for instance, a permissible counting range is defined in accordance with FIG. 1D; this range is selected such that it encompasses the entire spectrum of the injection start signals which occur and lasts until the appearance of the next subsequent reference marking. In the exemplary embodiment, this range encompasses the period of time or in other words the angular interval between two reference markings.

Figure 2:
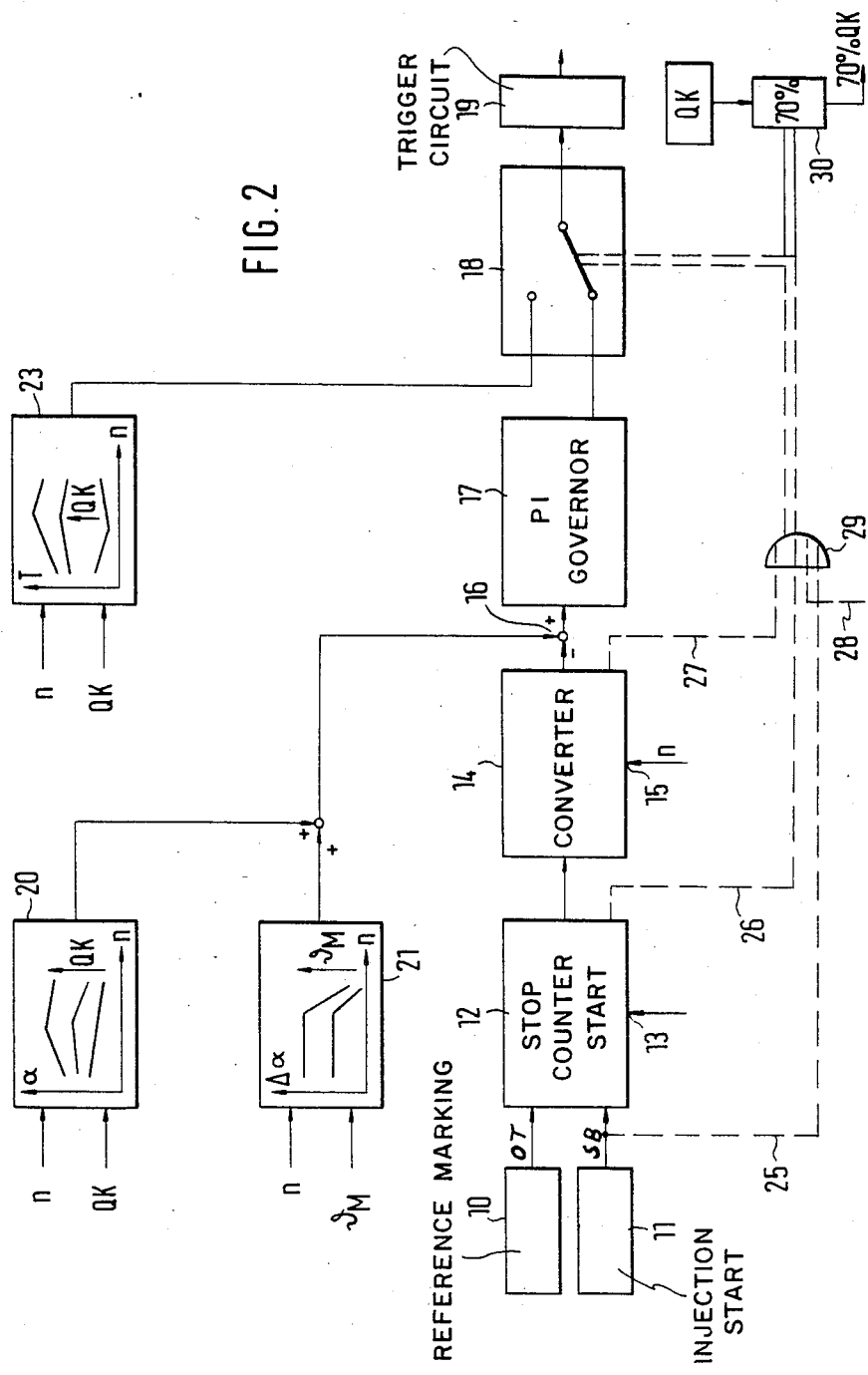
FIG. 2 shows the most important components, in terms of the invention, of this controlling device.

In FIG. 2, the elements required for understanding of the invention are shown in a block circuit diagram of the controlling device for the injection start according to the invention.

Sensors for the reference marking and for the injection start are indicated at 10 and 11. They pass their output signal on to a counter 12, the reference marking sensor 10 being connected with the STOP input of the counter 12 and the injection start sensor 11 being connected with the START input of the counter 12. A control input for the counter frequency of the counter 12 is marked 13. A frequency signal which is dependent on temperature or on the starting signal, for instance, is present at this control input 13. On the output side, the counter 12 is connected with a converter circuit 14, in which an angle signal relating to the crankshaft position is produced, with the aid of an rpm signal supplied via an rpm input 15 (detected, for example, via the frequency of recurrence of the reference marking). A comparison point 16, a PI governor 17, a switching circuit 18 and finally a trigger circuit 19 for a timing device (not shown) follow. The set-point value for the injection onset is produced in accordance with rpm and load via a characteristic data map 20, the output value of which is correctable in accordance with rpm and, in accordance with engine temperature, by means of a corrective map 21. The final set-point signal for the injection start then, like the actual signal, is supplied to the comparison point 16; the deviation between the actual and set-point signals is then processed in the governor 17 and finally delivered to the control circuit 19 for the timing device.

The alternating switch 18 shown in its normal position receives a signal at its second input from the open-loop control performance map 23 for the injection start, the values of which can be read out in accordance with rpm and load. In case of error, which is represented in the drawing by the dashed lines from the individual sensors and circuits leading to the alternating switch 18, the block 23 comes into play. The line 25 marks an injection start sensor failure; line 26 indicates an overly narrow counting range in the counter 12, for instance in the event of an incorrect counting signal; and line 27 indicates an error in the conversion circuit 14, which may be of various kinds. All three lines 25–27 and, as needed, a further error signal line 28 as well are carried to an OR gate 29, the output signal of which in turn determines the switching position of the alternating switch 18.

The mode of operation of the controlling device for the injection start shown in FIG. 2 is as follows:

If an injection signal as in FIG. 1B occurs, then the counter 12 starts its counting process, which lasts until the appearance of the reference marking, with a frequency which is controllable via the input 13. The result of counting, which finally corresponds to the signal duration shown in FIG. 1C, is then converted into a crankshaft angle signal. This signal indicates the angular position of the injection start, and this angular position is then compared with the set-point value formed via the performance map 20 and 21. The two performance maps 20 and 21 are embodied separately rather than in combined form, because in purely technical terms it is more expensive to produce multi-dimensional performance maps than to produce three-dimensional performance maps and then combine their output values.

In the PI governor 17 which follows, the deviation is then reduced to zero if possible, and the corresponding trigger signal for the timing device is furnished via the alternating switch 18.

In order to be able to maintain emergency operation in case of failure, injection start control values which are possible, although perhaps not optimal, are prepared in the open-loop control performance map 23. As shown in FIG. 2, in case of failure a fuel quantity limitation also comes into play, which can be realized by means of a limitation circuit 30. This circuit receives a fuel quantity control signal QK and in case of failure reduces this quantity signal to 70% of the originally required value, in order to assure that emergency vehicle operation is still possible.

With a view to computerized realizations, which are more and more in demand for the sake of flexibility, one possibility for a computerized realization of the invention is described below.

FIG. 3, in schematic form, shows a computer structure having a computer unit 35, a memory 36, a read-in counter 37, a read-out counter 38 and a data address bus 39. The START and STOP inputs 40 and 41, respectively, of the read-in counter 37 are preceded by pulse former circuits 42 and 43, which respond to the output signals of the sensors for the injection onset and for the reference marking. Leading to the computer 35, in addition to the data address bus 39, is a signal line 44 from the pulse former circuit 43; finally, a single input 45 clearly illustrates the manifold additional possibilities of controlling the computer unit 35. The output of the read-out counter 38 is followed by an end stage 46 (final control element) which in turn is again coupled with the controllable timing device 47.

Figure 4A:
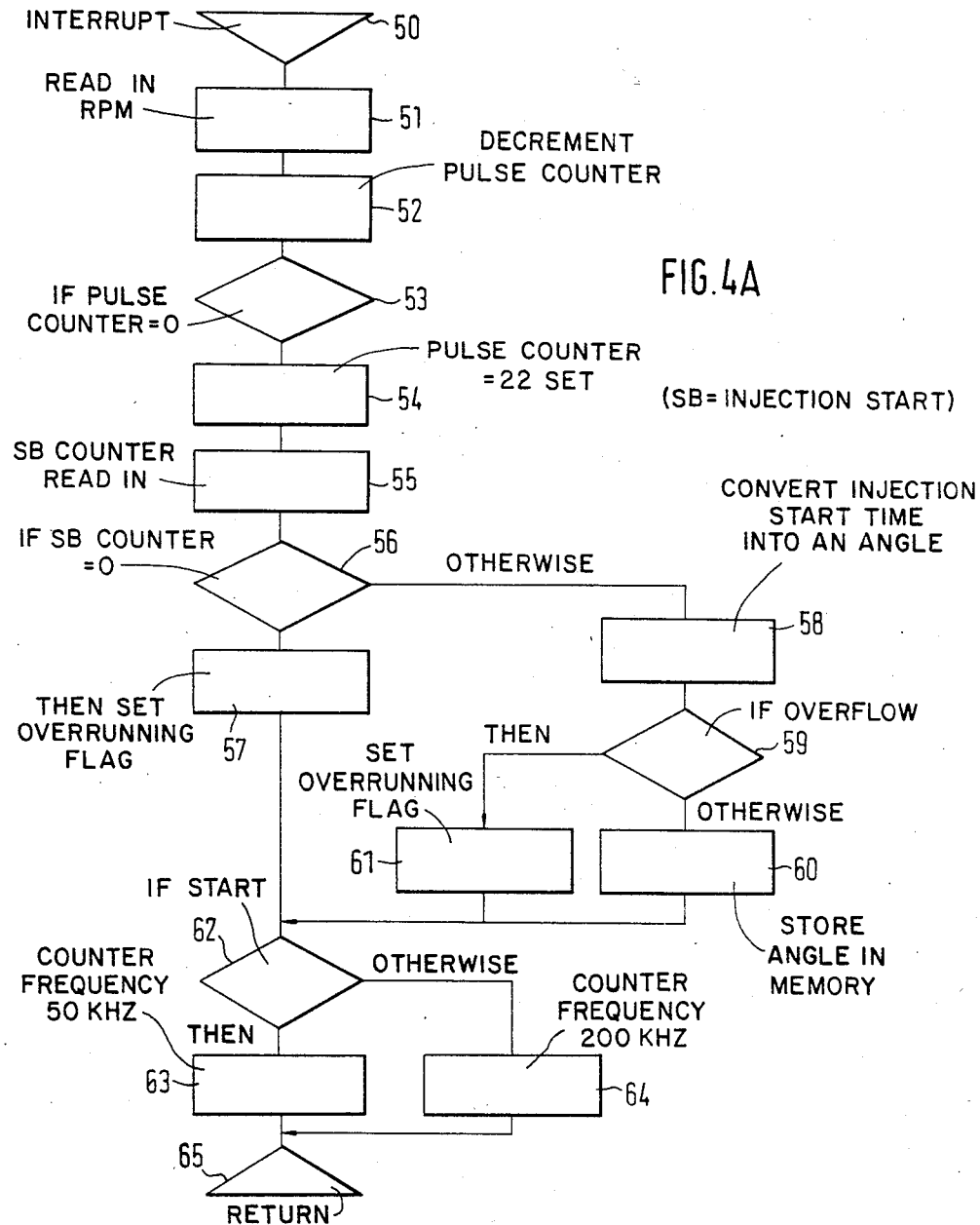
FIGS. 4A–4B show simple flow diagrams for the mode of operation of the subject of FIG. 3.

The flow diagram for controlling the injection start is given in FIG. 4A. An interrupt 50 obeys the command "read in rpm" 51. A safety counter is then decremented (52), and if its counter state is zero (53), then this counter is set with the number of cylinders times two. This corresponds to the number of reference markings within a crankshaft angle of 720°, or in the interval between two injection start pulses (54). The read-in counter (55) for the injection start is then read in, and in the next block (56) it is interrogated as to whether its content is zero. This case occurs if no injection start pulse has been present, which indicates the presence of overrunning or failure of the injection start sensor. As a result, an overrunning flag is set (57). Otherwise the conversion of the injection start time into an angle (58) is effected in accordance with the conversion circuit 14 of FIG. 2. If the result of conversion is an angle of less than a predetermined value, then the angle is stored in memory (60). Otherwise, again an overrunning flag is set (61). On the output side, the blocks "set overrunning flag" and "store angle in memory" are connected to a starting interrogation block 62. If starting is ascertained, then a counting frequency (in counter 12 of FIG. 2) of 50 kHz, for instance, is used; otherwise, if starting is not taking place, a counting frequency of 200 kHz, for instance, comes into play. A return jump 65 into the normal program course then occurs.

Different counting frequencies are selected for starting and for normal operation so that it will not be necessary to select an overly wide counting range, because of the great differences in rpm, and so that flexibility in this respect is still possible.

Figure 4B:
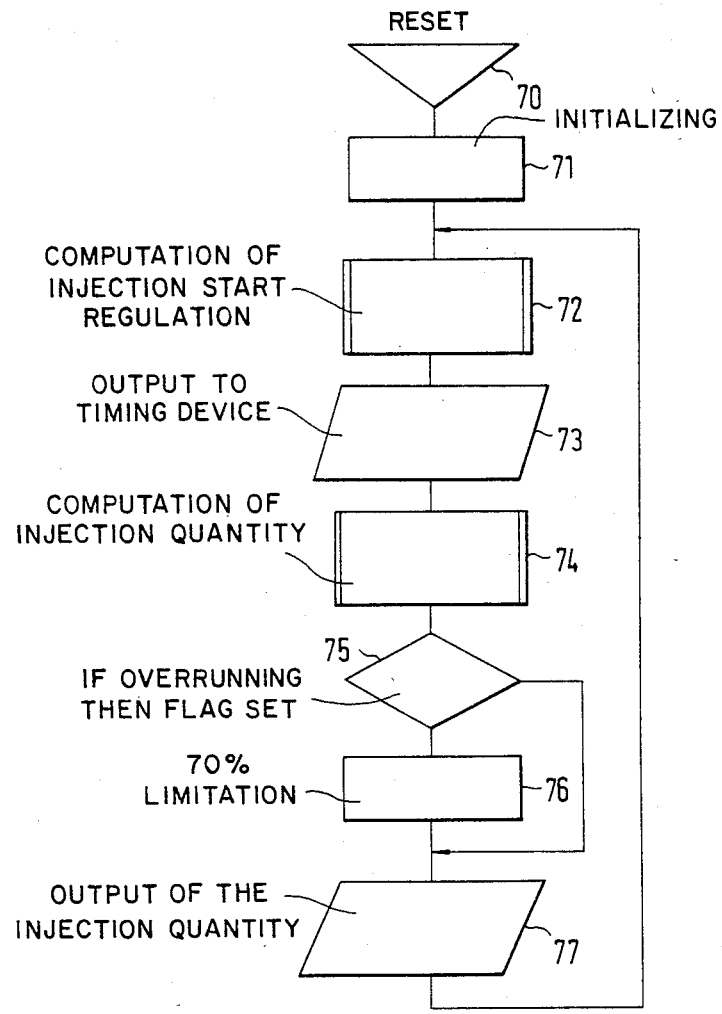

FIG. 4B illustrates the functioning of the limiter circuit 30 in the subject of FIG. 2. A reset block 70 and an initializing block 71 are are followed by a computation in terms of the injection start control 72, and the signal is then emitted to the timing device 73. Following this, the required injection quantity QK is computed (74) and an interrogation takes place (75) as to whether the overrunning or flag (57, 61) has been set (signifying either overrunning or error). If this is the case, then the fuel quantity is limited to 70% of its respective value (76) and this quantity (or, if the overrunning flag is not set, the entire quantity QK) is emitted (77). The processes in computing the injection start and the injection quantity are repeated continuously.

As already mentioned at the outset, the controlling device for the injection start according to the invention is distinguished by an uncomplicated sensor configuration. Because of the selected START/STOP control of the counter 12 of FIG. 2, it is also assured that stray interference pulses are virtually precluded from exerting any influence.

Although the subject of FIG. 2 provides a comparison of angular values at a comparison point 16, still in principle a purely time-based comparison can be made, in which case the conversion circuit 14 can be eliminated. The selection of the comparison values depends on various criteria of efficacy and must be made in accordance with individual cases.

The foregoing relates to preferred exemplary embodiments of the invention, it being understood that other embodiments and variants thereof are possible within the spirit and scope of the invention, the latter being defined by the appended claims.

What is claimed and desired to be secured by Letters Patent of the United States is:

1. A controlling device for the injection start in an internal combustion engine operating with self-ignition having sensors at least for the injection start, actual value of the crankshaft position, load and temperature, a set-point injection start control and a governor for the signal for the difference between the set-point and the actual values, comprising a counter means having a frequency signal input dependent on starting signals for counting the period of time elapsing between the actual value for the injection start and a reference marking relating to the crankshaft position, and means for comparing the output of said counter means with a set-point value for said governor.

2. A controlling device for the injection start in an internal combustion engine operating with self-ignition having sensors at least for the injection start, actual value of the crankshaft position, load and temperature, a set-point injection start control and a governor for the signal for the difference between the set-point and the actual values, comprising a counter means having a frequency signal input dependent on temperature for counting the period of time elapsing between the actual value for the injection start and a reference marking relating to the crankshaft position, and means for comparing the output of said counter means with a set-point value for said governor.

3. A controlling device as defined by claim 1, wherein said comparing means comprises means for converting said output of said counter means into an angle signal.

4. A controlling device as difined by claim 2, wherein said comparing means comprises means for converting said output of said counter means into an angle signal.

5. A method for a controlling device for the injection start in an internal combustion engine operating with self-ignition having sensors at least for the injection start, actual value of the crankshaft position, load and temperature, a set-point injection start control and a governor for the signal for the difference between the set-point and the actual values, comprising the steps of, counting by means of a frequency signal input dependent on starting signals the period of time elapsing between an actual value for the injection start and a reference marking relating to the crankshaft position, comparing the result of said counting step with a set-point value, and controlling the result of said comparing step.

6. A method for a controlling device for the injection start in an internal combustion engine operating with self-ignition having sensors at least for the injection start, actual value of the crankshaft positon, load and temperature, a set-point injection start control and a governor for the signal for the difference between the set-point and the actual values, comprising the steps of, counting by means of a frequency signal input dependent on temperature the period of time elapsing between an actual value for the injection start and a reference marking relating to the crankshaft position, comparing the result of said counting step with a set-point value, and controlling the result of said comparing step.

* * * * *